United States Patent
Kobayashi et al.

(10) Patent No.: US 7,873,487 B2
(45) Date of Patent: Jan. 18, 2011

(54) POSITION DETECTING DEVICE AND METHOD

(75) Inventors: Daisuke Kobayashi, Kariya (JP); Hisashi Kameya, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 67 days.

(21) Appl. No.: 12/372,165

(22) Filed: Feb. 17, 2009

(65) Prior Publication Data

US 2009/0254295 A1 Oct. 8, 2009

(30) Foreign Application Priority Data

Apr. 7, 2008 (JP) ............................... 2008-099258

(51) Int. Cl.
*G01C 17/38* (2006.01)

(52) U.S. Cl. ......................................... 702/94

(58) Field of Classification Search ................... 702/94, 702/151

See application file for complete search history.

(56) References Cited

U.S. PATENT DOCUMENTS

| 2003/0111974 A1 | 6/2003 | Suzuki |
| 2004/0010386 A1* | 1/2004 | Kameya ........................ 702/87 |
| 2005/0132802 A1* | 6/2005 | Kobayashi ................ 73/514.31 |

OTHER PUBLICATIONS

Japanese Office Action dated Feb. 25, 2010, issued in corresponding Japanese Application No. 2008-099258, with English translation.

* cited by examiner

*Primary Examiner*—Drew A Dunn
*Assistant Examiner*—Stephen J Cherry
(74) *Attorney, Agent, or Firm*—Nixon & Vanderhye PC

(57) ABSTRACT

A position detecting device for a motor includes a resolver, amplifiers and a microcomputer. The microcomputer corrects an amplified sine wave signal to have the same amplitude in both positive and negative polarities, and corrects an amplified cosine wave signal to have the same amplitude in both positive and negative polarities. The microcomputer further corrects the corrected sine wave signal or the corrected cosine wave signal to have the same amplitude therebetween. The rotation position is determined accurately based on the sine wave signal and the cosine wave signal of the same amplitude, even if the amplifiers have different operation characteristics.

5 Claims, 2 Drawing Sheets

POSITION DETECTING DEVICE AND METHOD

CROSS REFERENCE TO RELATED APPLICATION

This application is based on and incorporates herein by reference Japanese Patent Application No. 2008-99258 field on Apr. 7, 2008.

FIELD OF THE INVENTION

The present invention relates to a position detecting device and a position detecting method that use a resolver. More particularly, the present invention relates a position detecting device and a position detecting method that detects a position of an object by amplifying a sine wave signal and a cosine wave signal of a resolver provided in the object.

BACKGROUND OF THE INVENTION

Some conventional position detecting device uses a resolver, an amplifier circuit and a microcomputer as disclosed in US 2003/0111974 A1 (JP 2003-166803 A). The sine phase signal and the cosine phase signal produced by the resolver are amplified by the amplifier circuit in the interface circuit and applied to the microcomputer. The microcomputer calculates a difference between gains of the amplified sine phase signal and the amplified cosine phase signal produced by the I/F circuit, and corrects the outputs of the amplifier circuit in accordance with the calculated difference. Thus, the difference in the detected angle caused by the difference of the gains in the outputs of the amplifier circuit is reduced.

If the sine phase signal and the cosine phase signal are amplified, the positive amplitude and the negative amplitude of each of the amplified sine phase signal and the amplified cosine phase signal sometimes vary from each other. Therefore, the amplified sine phase signal and the amplified cosine phase signal are corrected based on the difference of gains of the sine phase signal and the cosine phase signal.

However, the difference between the positive amplitude and the negative amplitude of the sine phase signal or the cosine phase signal is not considered. As a result, it is not possible to reduce any error in the detection of the angular position caused by any difference between the positive amplitude and the negative amplitude of the amplified sine phase signal or the amplified cosine phase signal.

SUMMARY OF THE INVENTION

It is therefore an object of the present invention to provide a position detecting device and a position detecting method that enable accurate detection of position of an object even if a positive amplitude and a negative amplitude of an amplified sine wave signal and an amplified cosine wave signal of a resolver differ from each other.

According to the present invention, a first sine wave signal and a first cosine wave signal produced by a resolver provided in an object such as a motor is amplified to a second sine wave signal and a second cosine wave signal, respectively, and the position of the object is determined in accordance with the second sine wave signal and the second cosine wave signal. At least one of the second sine wave signal and the second cosine wave signal is corrected so that all of positive amplitudes and negative amplitudes of the second sine wave signal and the second cosine wave signal become equal one another and used to determine the position of the object.

In one exemplary case, the second sine wave signal is corrected based on a comparison of a positive amplitude and a negative amplitude of the second sine wave signal to produce a third sine wave signal, and the second cosine wave signal is corrected based on a comparison of a positive amplitude and a negative amplitude of the second cosine wave signal to produce a third cosine wave signal. Then, at least one of the third sine wave signal and the third cosine wave signal is corrected based on a comparison of an amplitude of the third sine wave signal and an amplitude of the third cosine wave signal to produce a fourth sine wave signal and a fourth cosine wave signal. The position of the object is determined by using the fourth sine wave signal and the fourth cosine wave signal.

BRIEF DESCRIPTION OF THE DRAWINGS

The above and other objects, features and advantages of the present invention will become apparent from the following detailed description made with reference to the accompanying drawings. In the drawings.

DETAILED DESCRIPTION OF THE PREFERRED EMBODIMENT

Figure 1:
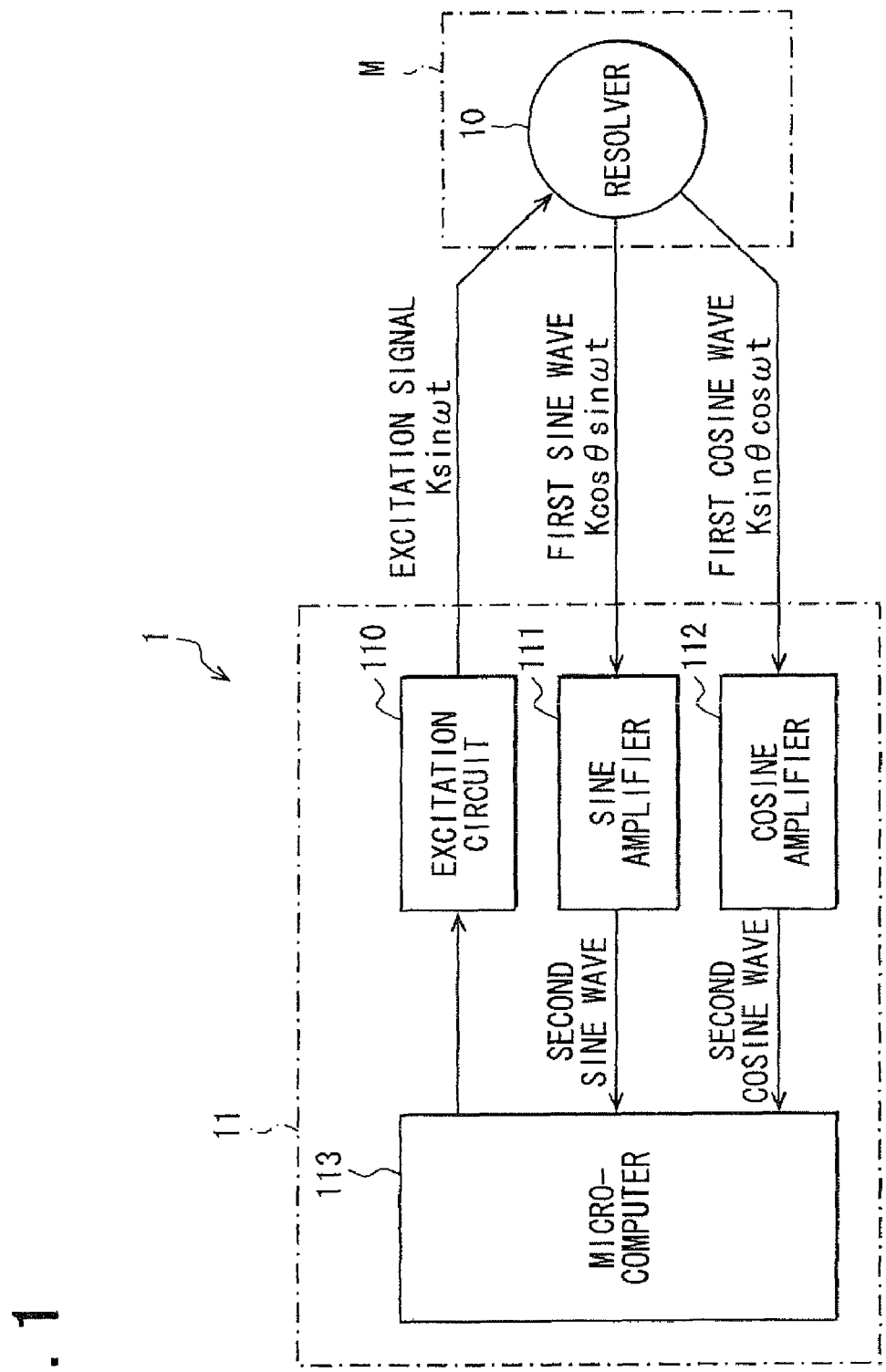
FIG. 1 is a block diagram showing a position detecting device for a motor according to an embodiment of the present invention.

Referring to FIG. 1, a position detecting device 1 includes a resolver 10 provided in a motor (not shown) M and an electronic signal processing unit 11.

The resolver 10 is configured to produce a first sine wave signal and a first cosine wave signal in the analog voltage form, which varies with a rotation angular position of a rotor shaft of the motor M, when an analog excitation signal is applied thereto. Specifically, when the exciting signal K sin ωt is applied, the resolver 10 produces a first sine wave signal K cos θ sin ωt and a first cosine wave signal K sin θ cos ωt, which vary with the rotation angle θ.

The signal processing unit 11 is configured to produce the excitation signal for the resolver 10 and calculates the position (rotation angle θ) of the motor M based on the first sine wave signal and the first cosine wave signal produced by the resolver 10. The signal processing unit 11 includes an excitation signal generator circuit (excitation circuit) 110, an analog sine wave signal amplifier circuit (sine amplifier) 111, an analog cosine wave signal amplifier circuit (cosine amplifier) 112 and a microcomputer (signal processor) 113.

The excitation circuit 110 is connected to the microcomputer 113 at the input terminal thereof and the resolver 10 at the output terminal thereof. It produces the excitation signal in response to a command from the microcomputer 113 and applies it to the resolver 10.

The sine amplifier 111 is connected to the resolver 10 at an input terminal thereof and the microcomputer 113 at the output terminal thereof. It amplifies the first sine wave signal produced from the resolver 10 and applies the amplified first sine wave signal to the microcomputer 113 as a second sine wave signal in the analog voltage form.

The cosine amplifier 112 is connected to the resolver 10 at the input terminal thereofr and the microcomputer 113 at an output terminal thereof. It amplifies the first cosine wave signal produced from the resolver 10 and applies the amplified first cosine wave signal to the microcomputer 113 as a second cosine wave signal in the analog voltage form.

The microcomputer 113 is configured and programmed to control the excitation circuit 110 so that the excitation circuit 110 responsively produces the excitation signal. It is further configured and programmed to correct the second sine wave signal and the second cosine wave signal received from the sine amplifier 111 and the cosine amplifier 112, respectively, and calculates the position (rotation angle) of the motor M based on the corrected signals.

The operation of the position detecting device 1, particularly the operation of the signal processing unit 11, is described next with further reference to FIG. 2.

The signal processing unit 11 starts its operation, when electric power is supplied thereto. With the excitation signal applied from the excitation circuit 110, the resolver 10 produces the first sine wave signal and the first cosine wave signal varying with the motor rotation angle θ. The amplifiers 111 and 112 amplify these signals and apply the second sine wave signal and the second cosine wave signal to the microcomputer 113.

As long as the motor rotation angle θ does not vary, the amplitudes of the first sine wave signal and the first cosine wave signal are equal to each other. However, the amplitudes sometimes become different between the second sine wave signal and the second cosine wave signal, if the sine amplifier 111 and the cosine amplifier 112 have operation characteristic variations. Further, in each of the second sine wave signal and the second cosine wave signal, the positive amplitude (voltage level in the positive polarity side) and the negative amplitude (voltage level in the negative polarity side) also sometimes become different.

As a first step in signal processing, the microcomputer 113 therefore measures the amplitudes and calculates a ratio between the positive amplitude and the negative amplitude of the second sine wave signal as a comparison result, and corrects at least one of the positive amplitude and the negative amplitude of the second sine wave signal in accordance with the calculated ratio to equalize the positive amplitude and the negative amplitude. Thus, a third sine wave signal having the same positive and negative amplitudes is determined. For example, the third sine wave signal may be determined by amplifying one of the positive amplitude or the negative amplitude of the second sine wave signal by a predetermined gain.

Similarly, the microcomputer measures the amplitudes and calculates a ratio between the positive amplitude and the negative amplitude of the second cosine wave signal as a comparison result, and corrects at least one of the positive amplitude and the negative amplitude of the second cosine wave signal in accordance with the calculated ratio to equalize the positive amplitude and the negative amplitude. Thus, a third cosine wave signal having the same positive and negative amplitudes is determined. For example, the third cosine wave signal may be determined by amplifying one of the positive amplitude or the negative amplitude of the second cosine wave signal by a predetermined gain.

If the positive amplitude and the negative amplitude of the second sine wave signal are equal to each other, the third sine wave signal may be determined by amplifying the second sine wave signal by a gain G=1 corresponding to the calculated ratio (R=1). That is, the third sine wave signal becomes the same as the second sine wave signal.

Similarly, if the positive amplitude and the negative amplitude of the second cosine wave signal are equal to each other, the third cosine wave signal may be determined by amplifying the second cosine wave signal by a gain G=1 corresponding to the calculated ratio (R=1). That is, the third cosine wave signal becomes the same as the second cosine wave signal.

As a second step of signal processing, the microcomputer 113 calculates a ratio of the amplitude of the third sine wave signal and the amplitude of the third cosine wave signal, and corrects at least one of the amplitudes of the third sine wave signal and the third cosine wave signal in accordance with the calculated ratio to equalize the amplitudes of the sine wave signal and the cosine wave signal. Thus, a fourth sine wave signal and a fourth cosine wave having the same amplitude are determined. For example, the fourth sine wave signal and the fourth cosine wave signal may be determined by amplifying only one of the third sine wave signal and the third cosine wave signal by a predetermined gain and maintaining the other of the two third wave signals. It is also possible to amplify both the third sine wave signal and the third cosine wave signal by different gains to determine the fourth sine wave signal and the fourth cosine wave signal having the same amplitudes.

If the amplitudes of the third sine wave signal and the third cosine wave signal are equal to each other, the fourth sine wave signal and the fourth cosine wave signal may be determined by converting the third sine wave signal and the third cosine wave signal by a gain G=1.

The microcomputer 113 thus determines the rotation angle of the motor M based on the fourth sine wave signal and the fourth cosine wave signal in the known manner. This determined rotation angle may be used to control the operation of the motor M in the known manner.

The operation is described in further detail with reference to an exemplary case, in which the negative amplitude of the second sine wave signal is less than the positive amplitude of the same.

Figure 2:
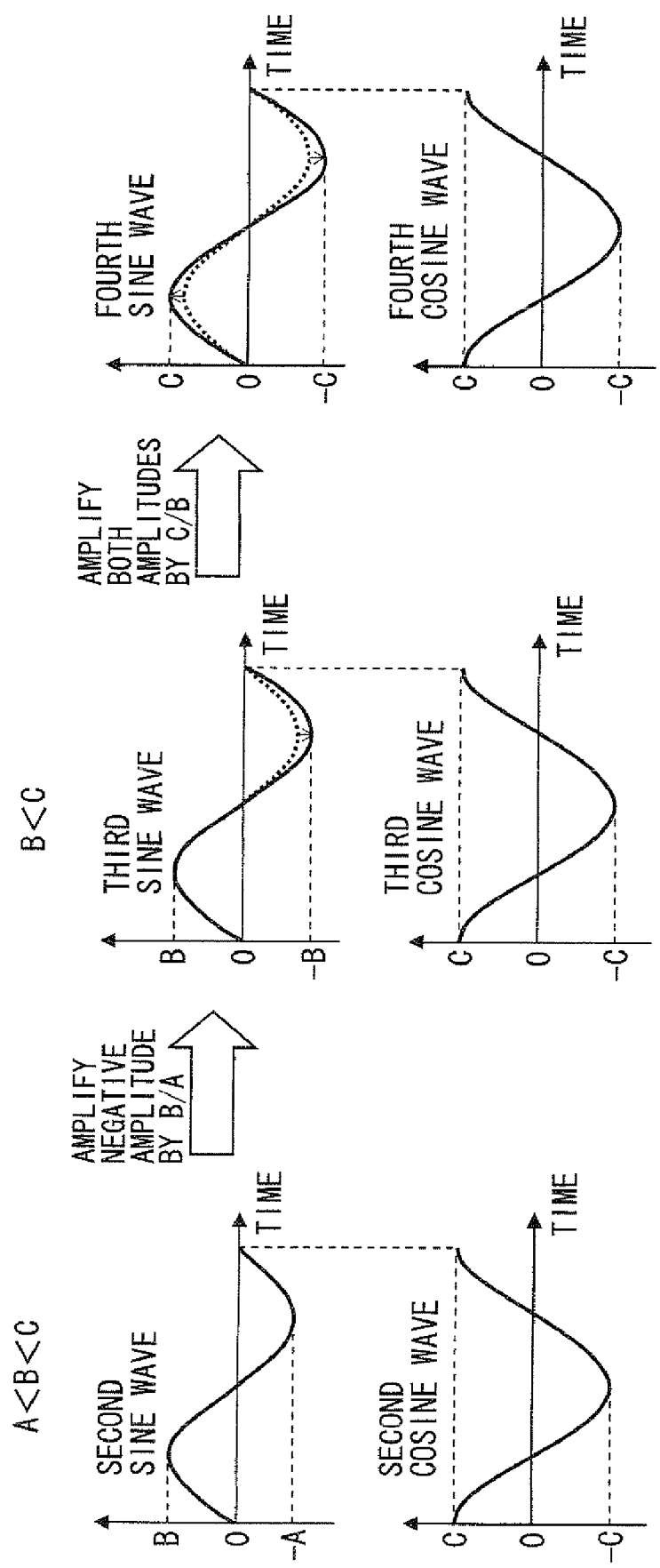
FIG. 2 is a waveform chart showing an operation of the position detecting device shown in FIG. 1.

As shown in FIG. 2, when the negative amplitude A of the second sine wave signal is less than the positive amplitude B of the same, the microcomputer 113 measures the amplitudes A and B, calculates the ratio of amplitudes between A and B and amplifies only the negative signal part by the gain G=B/A as shown by the solid line in FIG. 2. Thus, the third sine wave signal having the same amplitude B is determined.

The microcomputer 113 further measures the positive amplitude and the negative amplitude of the second cosine wave signal and compares the measured amplitudes. If the amplitudes C of the second cosine wave signal are equal to each other and greater than the amplitudes A and B of the second sine wave signal, the second cosine wave signal is used as it is as the third cosine wave signal.

The microcomputer 113 thus determines the third sine wave signal, which has the same amplitude B in both positive signal part and negative signal part, and the third cosine wave signal, which has the same amplitude C in both positive signal part and the negative signal part.

The microcomputer 113 then calculates the ratio of amplitudes B and C and amplifies only the third sine wave signal by the gain G=C/B to determine the fourth sine wave signal having the amplitudes C in both positive and negative signal parts. In this instance, both positive and negative signal parts are amplified as shown by the solid line in FIG. 2. The third cosine signal having the amplitudes C in both positive and negative signal parts are used as it is as the fourth cosine wave signal. Thus, the fourth sine wave signal and the fourth cosine wave signal having the same amplitudes are determined.

The microcomputer 113 then calculates the rotation angle of the motor M based on the two fourth signals having the same amplitude C.

According to the present embodiment, since the final (fourth) sine wave signal and the final (fourth) cosine wave signal used to determine the rotation position are corrected to have the same amplitudes therebetween and in both positive polarity and negative polarity in each of the final wave signals, the rotation position can be determined accurately even if the sine wave signal and the cosine wave signal of the resolver 10 are amplified by the amplifiers 111 and 112 having different operation characteristics.

Further, since each of the amplified (second) wave signals are corrected to have the same amplitudes in both positive amplitude and negative amplitude by using the ratio of its amplitudes in the positive polarity and the negative polarity, the variation in the positive amplitude and the negative amplitude can be suppressed surely.

Still further, since the final (fourth) sine wave signal and the final (fourth) cosine wave signal are determined to have the same amplitude therebetween by correcting either one of the preceding (third) wave signals in accordance with the ratio of magnitudes of the preceding wave signals, the variation in the magnitudes between the sine wave signal and the cosine wave signal can be suppressed surely.

The present embodiment may be modified as follows.

The second sine wave signal may be corrected by correcting the positive signal part by the ratio A/B so that the positive amplitude becomes the amplitude A, in place of correcting the negative signal part by the ratio B/A. Alternatively, the second sine wave signal may be corrected by correcting both the positive signal part and the negative signal part by respective gains different from each other as long as the resulting positive amplitude and the negative amplitude become equal.

The third cosine wave signal having the amplitude C may be corrected to become equal to the amplitude B of the third sine wave signal, in place of correcting the third sine wave signal to have the amplitude C. Alternatively, both the third sine wave signal and the third cosine wave signal may be corrected to have the same amplitude different from any of the amplitudes B and C.

What is claimed is:

1. A position detecting device comprising:
    a resolver that produces a first sine wave signal and a first cosine wave signal varying in accordance with a position of an object when an excitation signal is applied;
    a sine wave signal amplifier circuit that amplifies the first sine wave signal and produces an amplified first sine wave signal as a second sine wave signal;
    a cosine wave signal amplifier circuit that amplifies the first cosine wave signal and produces an amplified first cosine wave signal as a second cosine wave signal; and
    a computer that determines a position of the object in accordance with the second sine wave signal and the second cosine wave signal,
    wherein the computer is configured to (a) correct the second sine wave signal based on a comparison of a positive amplitude and a negative amplitude of the second sine wave signal to produce a third sine wave signal, (b) correct the second cosine wave signal based on a comparison of a positive amplitude and a negative amplitude of the second cosine wave signal to produce a third cosine wave signal, (c) correct at least one of the third sine wave signal and the third cosine wave signals based on a comparison of an amplitude of the third sine wave signal and an amplitude of the third cosine wave signal to produce a fourth sine wave signal and a fourth cosine wave signal, and (d) determine the position of the object based on the fourth sine wave signal and the fourth cosine wave signal, and
    wherein the computer is configured to correct the positive amplitude and the negative amplitude of the second sine wave signal differently based on a comparison result indicating that the positive amplitude and the negative amplitude of the second sine wave signal differ from each other so that the third sine wave signal has the same positive amplitude and negative amplitude, and to correct the positive amplitude and the negative amplitude of the second cosine wave signal differently based on a comparison result indicating that the positive amplitude and the negative amplitude of the second cosine wave signal differ from each other so that the third cosine wave signal has the same positive amplitude and negative amplitude.

2. The position detecting device according to claim 1, wherein the computer is configured to correct at least one of the third sine wave signal and the third cosine wave signal based on a ratio between the amplitude of the third sine wave signal and the amplitude of the third cosine wave signal so that the fourth sine wave signal and the fourth cosine wave signal have the same amplitudes.

3. The position detecting device according to claim 1, wherein the resolver is provided in a motor to produce the first sine wave signal and the first cosine wave signal in correspondence to a rotation angle of the motor.

4. A position detecting method for determining a position of an object, the method comprising:
    amplifying a first sine wave signal and a first cosine wave signal produced by a resolver provided in the object to a second sine wave signal and a second cosine wave signal, respectively;
    correcting at least one of the second sine wave signal and the second cosine wave signal so that all of positive amplitudes and negative amplitudes of the second sine wave signal and the second cosine wave signal become equal to one another; and
    determining the position of the object in accordance with the corrected second sine wave signal and the corrected second cosine wave signal,
    wherein the correcting step includes:
    a first sub-step of correcting the second sine wave signal based on a comparison of a positive amplitude and a negative amplitude of the second sine wave signal to produce a third sine wave signal, and correcting the second cosine wave signal based on a comparison of a positive amplitude and a negative amplitude of the second cosine wave signal to produce a third cosine wave signal; and
    a second sub-step of correcting at least one of the third sine wave signal and the third cosine wave signal based on a comparison of an amplitude of the third sine wave signal and an amplitude of the third cosine wave signal to produce a fourth sine wave signal and a fourth cosine wave signal,
    wherein the determining step uses the fourth sine wave signal and the fourth cosine wave signal, and
    wherein the first sub-step corrects at least one of the positive amplitude and the negative amplitude of the second sine wave signal based on a ratio between the positive amplitude and the negative amplitude of the second sine wave signal when a comparison result indicates a difference between the positive and negative amplitudes so that the third sine wave signal has same positive amplitude and negative amplitude, and corrects at least one of the positive amplitude and the negative amplitude of the second cosine wave signal based on a ratio between the positive amplitude and the negative amplitude of the second cosine wave signal so that the third cosine wave signal has the same positive amplitude and negative amplitude.

5. The position detection correcting method according to claim 4, wherein the second sub-step corrects at least one of the third sine wave signal and the third cosine wave signal based on a ratio between the amplitude of the third sine wave signal and the amplitude of the third cosine wave signal so that the fourth sine wave signal and the fourth cosine wave signal have the same amplitudes.

* * * * *